United States Patent Office 3,187,540
Patented June 8, 1965

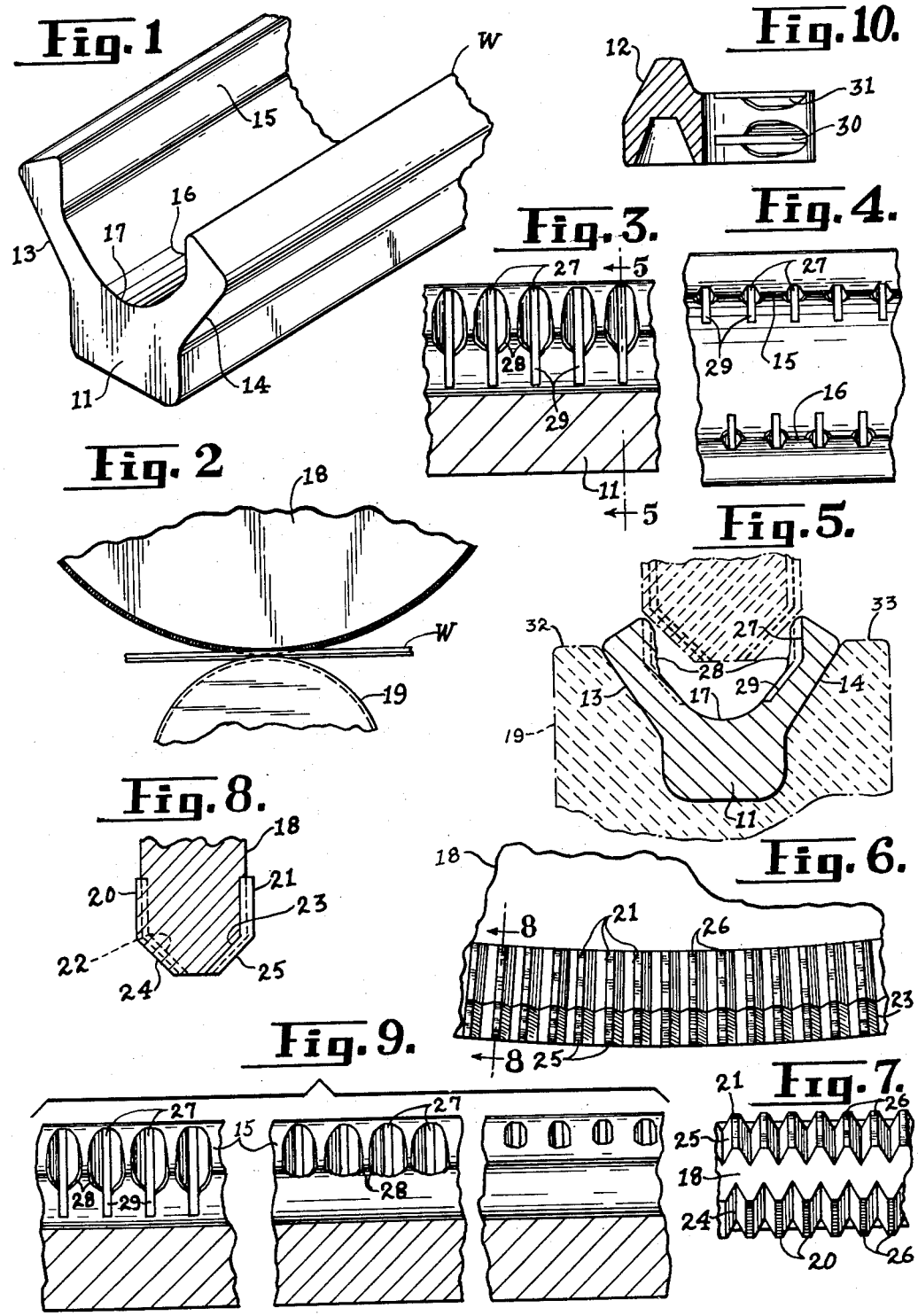

3,187,540
PROCESS AND APPARATUS FOR MAKING ZIPPER FASTENER ELEMENTS
James MacBroom, Wolcott, Conn., assignor to Scovill Manufacturing Company, Waterbury, Conn., a corporation of Connecticut
Filed Mar. 15, 1963, Ser. No. 265,556
3 Claims. (Cl. 72—197)

This invention is an improved process and apparatus for manufacturing zipper fastener elements from a continuous wire of generally Y-shaped cross-section. It has particularly to do with the formation of indentations on the inner surfaces of the legs of the fastener elements for the purpose of increasing their gripping power on the tape.

One prior method of forming such indentations or grooves on the jaws of the fastener elements is shown in the patent to Firing 3,068,549. While the apparatus of that patent has proven to be successful, it does involve the additional expense of equipping and maintaining extra parts for each individual fastener-making machine.

The general object of the present invention is to preform the continuous wire in such a way that when it is later sliced into fastener element blanks in the fastener-making machine, each of the jaws of the individual blanks will have the necessary indentations and/or ribs to provide the extra gripping power desired. This is accomplished as a final rolling step in the process of rolling the continuous wire. Prior attempts along this line have not been successful due to the unusual difficulties which arise from the particular shape of the surfaces of the channel in the Y-section wire. This shape involves substantially parallel surfaces extending from the ends of the legs of the Y-shaped section, which in an average size zipper, extend for about .025" to .028". These are the portions in which it is most desirable to have the interior grooved or ribbed effect for maximum holding power on the tape.

According to my invention, grooves are plowed into these parallel side surfaces of the channel by radially extending teeth on the opposite outer side faces of the forming roll adjacent its periphery. While the actual extent of such teeth in a lateral direction may be of the order of .005", they will work or plow endwise into the parallel surface of the wire channel during the rolling operation to a depth of the order of .025" to .028". This has been found possible by making a comparatively large wheel with a great number of radially extending knurled teeth along the side faces of the roll adjacent its periphery. In making wire for the average size zipper, for example, such a roll is of the order of 20" in diameter and the number of teeth on each side is of the order of 2500. To manufacture such a roll by normal machining methods, with the ribs on one side always in transverse alignment with those on the other side, would be prohibitively expensive. I have discovered, however, that these radial ribs can be formed cheaply by a small master knurling tool and that their arrangement relative to one another so far as transverse alignment is concerned, will be at random.

According to the invention, however, the pitch of such radial ribs and thus of the grooves on the wire, may be made about ⅔ that of the thickness of a zipper fastener element. This means that when the wire is cut into the fastener element blanks, the jaws will have on their inner surfaces at least one complete groove which need not be directly across from a similar groove in the opposed jaw on the fastener member. Nevertheless, this does not materially lessen the gripping power of the jaws on the zipper tape.

The inner surfaces of the Y-shaped channel beyond the above-mentioned parallel sections which form the crotch of the fastener element, may also be indented by ribs projecting outwardly from the angular edge of the forming roll beyond the straight radial ribs on the sides of the rolls.

In the accompanying drawing, I have shown for purposes of illustration, one embodiment which the invention may assume in practice. In the drawing:

FIG. 1 is a perspective view of the Y-shaped wire at the beginning of the process;

FIG. 2 is a side view of the forming and back-up rolls operating on the wire;

FIG. 3 is a central longitudinal section of the wire after the final rolling operation according to my invention;

FIG. 4 is a plan view of a portion of the wire looking into the channel;

FIG. 5 is a cross-section of the wire on line 5—5 of FIG. 3 with the forming and back-up rolls shown in phantom;

FIG. 6 is a side view of a portion of the forming roll greatly enlarged;

FIG. 7 is an edge view of the same;

FIG. 8 is a cross-sectional view of the wheel taken along the line 8—8 of FIG. 6;

FIG. 9 is a series of sectional views of the wire showing progressive operation of the forming roll; and, FIG. 10 is a sectional view of one of the completed elements after it is sheared from the wire.

The Y-shaped wire as used in my improved method of manufacturing metal zippers has a comparatively thick portion 11 on one side from which the head 12 of the zipper element is formed. On the other side, there is a comparatively deep channel to provide side portions 13 and 14 from which the legs or jaws of the zipper elements are formed. This channel, adjacent its entrance portion, has parallel surfaces 15 and 16 extending a substantial distance into the channel which may be of the order of .025" to .028" in an average size zipper. Beyond these surfaces, the channel is in the shape of a generally U-shaped crotch 17. It will be understood that the rolling of the wire to this shape as shown in FIG. 1, forms no part of my invention, which rather deals with a final rolling step performed on the wire as seen in FIG. 1.

The operation as indicated diagrammatically in FIG. 2 where the wire is designated W, utilizes a large forming roll 18 and a back-up roll 19 adapted to engage around the portion 11 of the wire opposite the wire channel. As shown in phantom lines in FIG. 5, the groove around the periphery of the supporting roll 19 is so shaped as to provide side supporting portions 32 and 33 adapted to extend over and support the side portions 13 and 14 of the wire. Since the roll 18 is very large compared to the wire dimensions, no substantial detail is indicated in FIG. 2. The detailed construction, as it appears in the enlarged view 6, 7 and 8, includes the radially extending teeth 20 and 21 on opposite side faces of the roll adjacent its periphery. As above stated, in order for the apparatus to be practical, these teeth must be formed economically as by means of a master knurling roll. In such case, it is impossible as a practical matter to have the teeth 20 aligned transversely with the teeth 21 so that their relative transverse positions will normally be offset from one another. This arrangement is evident from FIG. 7. The peripheral portion of the forming roll 18 beyond the radially extending teeth has angular surfaces 22 and 23 having knurled teeth 24 and 25, respectively, extending across said surfaces. These teeth 24 and 25 are also formed by knurling rolls which will line up with the radial teeth on their respective sides because the teeth on the roll will automatically follow into grooves between the end portions of the radial teeth 20 and 21. All of these teeth have narrow flat outer surfaces as indicated at 26 in FIGS. 6 and 7.

The result of the rolling operation on the wire by means of the rolls which have been described, is indicated in FIGS. 3, 4 and 5 with the progressive action being indicated in FIG. 9. In this figure, as the forming roll approaches the wire, the outer corners of the radial teeth 20 and 21 will come against the parallel surfaces 15 and 16 and plow into these surfaces to form grooves 27, and an earlier stage of this process is shown at the right-hand portion of FIG. 9. As the radial teeth come further into the wire, the grooves will widen and begin to throw up lips of metal at the sides as indicated at 28 in the central portion of FIG. 9. As the roll teeth sweep further, the angular teeth 24 and 25 will form groove portions 29 in the crotch portion 17 of the wire. It will thus be seen that the size of the forming roll 18 contributes importantly to the successful rolling of the grooves since the radial teeth must enter endwise into the parallel surfaces 15 and 16, and the relative angular movement of such radial teeth is almost negligible so that the formation of the grooves is substantially the same as might be formed with a similar tool applied perpendicularly to the wire.

The pitch of each set of radial and angular teeth is necessarily less than the thickness of a fastener element blank which is supplied from the wire in the fastener-making machine and preferably, it is a major fraction of such thickness, e.g., ⅔ of the same. Thus, when the blank is sliced off as seen in FIG. 10, there will be one entire groove designated 30 in FIG. 10 and a portion 31 of another groove. There may even be two partial grooves—one on each side of a whole groove close to the central part of the fastener element. Since the portions of the grooves on one side of the channel are necessarily at random with respect to the positions of the grooves on the other side of the channel, the grooves 30 and partial groove 31 on one leg of the finished fastener element will not necessarily line up transversely with those on the other leg. However, variations in the precise arrangement of the grooves do not make any material difference in the holding power of the fastener element on the tape.

What I claim is:

1. Apparatus for forming grooves in a Y-section wire for the manufacture of zipper fastener elements, the channel of such wire having substantially parallel surfaces adjacent the entrance to the channel, which apparatus consists essentially of a forming roll having radial teeth on the opposite outer side faces of the roll adjacent its periphery, the length of such teeth being at least as great as the depth of said channel parallel surfaces, the pitch of said teeth being only a major fraction of the thickness of a fastener element to be formed and thus substantially less than half the length of said radial teeth, the relative positions of the teeth on opposite side faces of the forming roll being offset with regard to transverse alignment, and a supporting roll adapted to engage those portions of the wire opposite said channel.

2. Apparatus as defined in claim 1 wherein the peripheral portion of said forming roll beyond said radial teeth has converging angular surfaces which have teeth extending across said surfaces.

3. Apparatus as defined in claim 1 wherein said forming roll is of such size that the number of said radial teeth on each side surface of the roll is of the order of 2500.

References Cited by the Examiner

UNITED STATES PATENTS

| 20,942 | 7/58 | Field | 80—30 |
| 2,552,364 | 5/51 | Bradbury | 80—30 |
| 2,811,882 | 11/57 | Hess | 80—30 |
| 2,911,865 | 11/59 | Brickman | 80—30 |
| 2,989,803 | 6/61 | Chery | 29—410 |
| 3,091,024 | 5/63 | Poux | 29—410 |

FOREIGN PATENTS 452,596    11/48    Canada.

CHARLES W. LANHAM, *Primary Examiner*.